US012674529B2

(12) United States Patent
Doi et al.

(10) Patent No.: US 12,674,529 B2
(45) Date of Patent: Jul. 7, 2026

(54) GIRTH WELDED JOINT OF STEEL PIPE

(71) Applicant: NIPPON STEEL CORPORATION, Tokyo (JP)

(72) Inventors: Akira Doi, Tokyo (JP); Takeshi Miki, Tokyo (JP); Hiroyuki Nagayama, Tokyo (JP); Naoki Kuroda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 374 days.

(21) Appl. No.: 18/683,569

(22) PCT Filed: Oct. 25, 2022

(86) PCT No.: PCT/JP2022/039628
§ 371 (c)(1),
(2) Date: Feb. 14, 2024

(87) PCT Pub. No.: WO2023/074658
PCT Pub. Date: May 4, 2023

(65) Prior Publication Data
US 2024/0353033 A1 Oct. 24, 2024

(30) Foreign Application Priority Data
Oct. 26, 2021 (JP) ................................. 2021-175002

(51) Int. Cl.
F16L 13/02 (2006.01)
C22C 38/00 (2006.01)
(Continued)

(52) U.S. Cl.
CPC ............ F16L 13/02 (2013.01); C22C 38/001 (2013.01); C22C 38/02 (2013.01); C22C 38/04 (2013.01); C22C 38/06 (2013.01); C22C 38/42
(2013.01); C22C 38/44 (2013.01); C22C 38/46 (2013.01); C22C 38/48 (2013.01); C22C 38/50 (2013.01);
(Continued)

(58) Field of Classification Search
CPC ......... C22C 38/44; C22C 38/46; C22C 38/50; C22C 38/58; C21D 8/10; C21D 9/08; C21D 9/50
See application file for complete search history.

(56) References Cited

U.S. PATENT DOCUMENTS

2011/0247733 A1    10/2011  Arai et al.
2019/0177813 A1     6/2019  Miki et al.

FOREIGN PATENT DOCUMENTS

JP          2001240913 A      9/2001
JP          2012193404 A     10/2012
(Continued)

*Primary Examiner* — Jessee R Roe
(74) *Attorney, Agent, or Firm* — Greer Burns & Crain Ltd.

(57) ABSTRACT

A girth welded joint of steel pipe 10 includes base metal portions 1a, 1b and a girth welded portion 2, wherein the girth welded portion 2 is formed of a weld metal portion 2a and weld heat affected zones 2b, 2c, the base metal portions 1a, 1b have a predetermined chemical composition, Pcm is within a range of 0.25 to 0.30, the weld metal portion 2a has a predetermined chemical composition, a content of B is 0.0010% or less, tensile strength of both base metal portions 1a, 1b and tensile strength of the girth welded portion 2 in a cross weld tensile test is 980 MPa or more, average hardness of the base metal portions 1a, 1b is 300 HV10 or more, an average softening width of the weld heat affected zones 2b, 2c is 4.0 mm or less, and an average softening degree is 80 HV10 or less.

4 Claims, 3 Drawing Sheets

(51) Int. Cl.

| | |
|---|---|
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |

(52) U.S. Cl.
CPC .............. *C22C 38/54* (2013.01); *C22C 38/58* (2013.01); *C22C 2202/00* (2013.01)

(56)     References Cited

FOREIGN PATENT DOCUMENTS

| WO | 2010061882 A1 | 6/2010 |
|---|---|---|
| WO | 2018025778 A1 | 2/2018 |

(Unit: mm)

(Unit: mm)

GIRTH WELDED JOINT OF STEEL PIPE

TECHNICAL FIELD

The present invention relates to a girth welded joint of steel pipe.

BACKGROUND ART

Conventionally, among machine structural members, those having a cylindrical shape are often regulated to have mechanical properties necessary for the machine structural members by subjecting a steel bar to forging or elongation rolling, or further to cutting working so as to have a desired shape, before being subjected to heat treatment.

However, in recent years, due to tendencies for increases in size and yield stress of mechanical structures, a reduction in weight is achieved by replacing machine structural members having a cylindrical shape with hollow seamless steel pipes. In particular, steel pipes used for the boom of a crane are required to have high strength and high toughness due to the necessity of operation in cold locations in addition to the increase in size of cranes for high-rise buildings. Specifically, recently, there has been an increasing demand for using seamless steel pipes having tensile strength of 980 MPa or more and excellent toughness at a low temperature of −40° C. for crane booms.

Various techniques are disclosed with respect to a seamless steel pipe having high strength and high toughness and with respect to a method for producing the seamless steel pipe.

Patent Document 1, for example, discloses a method that can produce a high strength seamless steel pipe having excellent toughness by online thermo-mechanical treatment without adding expensive alloy steel.

Patent Document 2 discloses a seamless steel pipe having tensile strength of 950 MPa or more, yield stress of 850 MPa or more, and Charpy absorbed energy at −40° C. of 60 J or more, and discloses a method for producing the seamless steel pipe.

Patent Document 3 discloses a seamless steel pipe having tensile strength of 950 MPa or more, yield stress of 850 MPa or more, Charpy absorbed energy at −40° C. of 60 J or more, and a wall thickness of more than 30 mm, and discloses a method for producing the seamless steel pipe.

Patent Document 4 discloses a seamless steel pipe having high strength, that is, tensile strength of 980 MPa or more, and having excellent low-temperature toughness, a small Pcm of 0.30 or less, and excellent weldability.

LIST OF PRIOR ART DOCUMENTS

Patent Document

Patent Document 1: JP2001-240913A
Patent Document 2: WO 2010/061882
Patent Document 3: JP2012-193404A
Patent Document 4: WO 2018/025778

SUMMARY OF INVENTION

Technical Problem

In the case in which the above-mentioned seamless steel pipes are used for a large-sized mechanical structure, in general, a plurality of seamless steel pipes is joined by girth welding to form a welded joint. Therefore, to achieve a reduction in weight of the mechanical structure, not only the seamless steel pipes, but also the welded joint is required to have sufficient strength.

In addition, weld cracking, such as cold cracking, easily occurs in the welded zone of the welded joint and hence, from the viewpoint of safety, the welded zone is required to have excellent cold cracking resistance.

It is an objective of the present invention to provide a girth welded joint of steel pipe having high joint strength and excellent cold cracking resistance.

Solution to Problem

The present invention has been made to solve the above-mentioned problems, and the gist of the present invention is a girth welded joint of steel pipe described below.

(1) A girth welded joint of steel pipe including: a base metal portion and a girth welded portion, wherein the girth welded portion is formed of a weld metal portion and a weld heat affected zone, a chemical composition of the base metal portion consists of, by mass %, C: 0.10 to 0.20%,
Si: 0.05 to 1.00%,
Mn: 0.05 to 1.20%,
P: 0.025% or less,
S: 0.005% or less,
Cu: 0.20% or less,
N: 0.007% or less,
Ni: 0.20 to 0.50%,
Cr: 0.30% or more and less than 0.50%,
Mo: 0.30 to 0.50%,
Nb: 0.01 to 0.05%,
Al: 0.001 to 0.100%,
B: 0.0005 to 0.0020%,
Ti: 0.003 to 0.050%,
V: 0.01 to 0.20%,
a total of any one or more selected from Ca, Mg, and REM: 0 to 0.0250%, and balance: Fe and impurities,
a value of Pcm expressed by a formula [A] described below is within a range of 0.25 to 0.30,
a chemical composition of the weld metal portion consists of, by mass %,
C: 0.04 to 0.14%,
Si: 0.05 to 1.00%,
Mn: 1.00 to 2.00%,
P: 0.025% or less,
S: 0.005% or less,
Cu: 0.50% or less,
N: 0.007% or less,
Ni: 2.50 to 3.00%,
Cr: 0.90% or more and less than 1.40%,
Mo: 0.40 to 0.90%,
Nb: 0.010% or less,
Al: 0.010% or less,
B: 0.0010% or less,
Ti: 0.003 to 0.050%,
V: 0.01 to 0.20%,
a total of any one or more selected from Ca, Mg, and REM: 0 to 0.0250%, and balance: Fe and impurities,
each of tensile strength of the base metal portion and tensile strength of the girth welded portion in a cross weld tensile test is 980 MPa or more, and
average hardness of the base metal portion is 300 HV10 or more, an average softening width of the weld heat affected zone is 4.0 mm or less, and an average softening degree of the weld heat affected zone is 80 HV10 or less:

$$Pcm = C + (Si/30) + (Mn/20) + \qquad [A]$$
$$(Cu/20) + (Ni/60) + (Cr/20) + (Mo/15) + (V/10) + 5B$$

where each symbol of an element in the formula [A] denotes a content (mass %) of the element contained in steel, and 0 is given when the element is not contained in the steel.

(2) The girth welded joint of steel pipe described in the above-mentioned (1), wherein a metallographic micro-structure of the base metal portion includes, by area %, tempered martensite: 90% or more.

(3) The girth welded joint of steel pipe described in the above-mentioned (1) or (2), wherein the weld metal portion is made of multi-pass weld metal.

Advantageous Effects of Invention

According to the present invention, it is possible to obtain a girth welded joint of steel pipe having high joint strength and excellent cold cracking resistance.

DESCRIPTION OF EMBODIMENTS

In the seamless steel pipe described in Patent Document 4, both strength and toughness are secured by limiting Pcm (weld crack susceptibility composition (%)) expressed by the following formula [A] to 0.30 or less, and by increasing hardenability by setting a content of B to an appropriate amount:

$$Pcm = C + (Si/30) + (Mn/20) + \qquad [A]$$
$$(Cu/20) + (Ni/60) + (Cr/20) + (Mo/15) + (V/10) + 5B$$

where each symbol of an element in the formula [A] denotes a content (mass %) of the element contained in steel, and 0 is given when the element is not contained in the steel.

Inventors of the present invention have conducted studies on a method for achieving both high joint strength and excellent cold cracking resistance based on the technique described in Patent Document 4 and, as a result, reached the following findings.

(a) By suppressing Pcm to a low value, it is possible to suppress cold cracking during welding. However, a reduction in Pcm causes the lowering of strength and hence, when a welded joint is produced by using the seamless steel pipes described in Patent Document 4 as base metal, there may be cases in which sufficient joint strength cannot be obtained.

(b) In the seamless steel pipe described in Patent Document 4, strength is increased by optimizing the content of B. However, in the case in which B is contained in the base metal, there may be cases in which B also flows into weld metal, thus causing solidification cracking or the like.

(c) To prevent weld cracking while ensuring joint strength, it is effective to provide the lower limit to Pcm, and to suppress the lowering of strength of the welded zone as much as possible by optimizing welding conditions.

The present invention has been made based on the above-mentioned findings. Hereinafter, the respective requirements of the present invention will be described in detail.

(A) Overall Configuration

Figure 1:
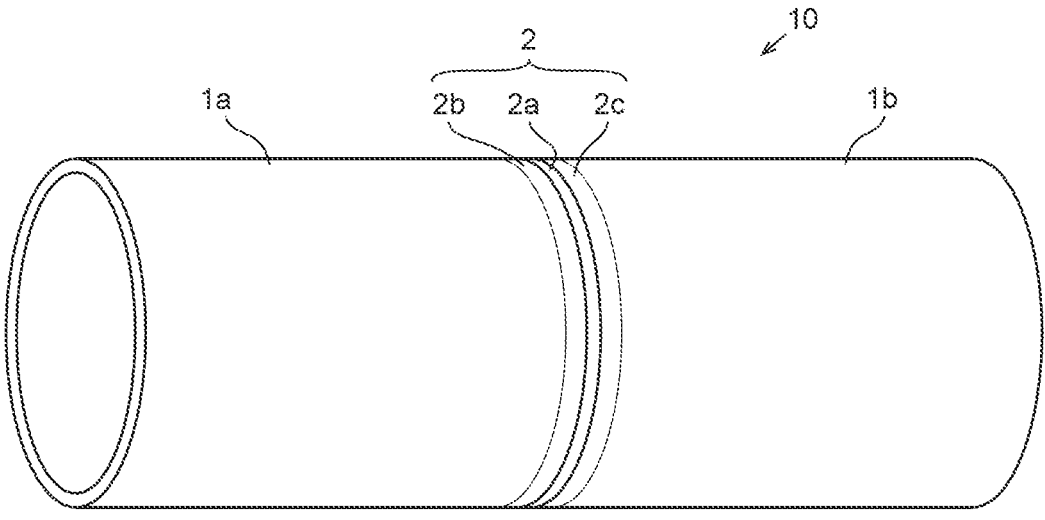
FIG. 1 is a schematic view showing a girth welded joint of steel pipe according to one embodiment of the present invention.

FIG. 1 is a schematic view showing a girth welded joint of steel pipe according to one embodiment of the present invention. As shown in FIG. 1, a girth welded joint of steel pipe 10 includes base metal portions 1a, 1b and girth welded portion 2. That is, the girth welded joint of steel pipe 10 is a joint obtained by joining the base metal portion 1a and the base metal portion 1b together by girth welding. The girth welded portion is formed of a weld metal portion 2a and weld heat affected zones 2b, 2c. The base metal portions 1a, 1b have a pipe shape, and may be seamless steel pipes or welded steel pipes, for example.

(B) Chemical Composition of Base Metal Portion

The reasons for limiting the chemical composition of the base metal portion are as follows. In the description made hereinafter, symbol "%" for a content of each element refers to "mass %".

C: 0.10 to 0.20%

C is an indispensable element for increasing strength. When a content of C is less than 0.10%, there may be cases in which it is difficult to obtain high strength, that is, tensile strength of 980 MPa or more, due to the relationship with other elements. In contrast, when the content of C is more than 0.20%, weldability is remarkably lowered. Accordingly, the content of C is set to within a range of 0.10 to 0.20%. The content of C is preferably set to within a range of 0.12% or more and 0.18% or less.

Si: 0.05 to 1.00%

Si has a deoxidation action, and also has an action of enhancing strength and hardenability. To obtain such advantageous effects, it is necessary to set a content of Si to 0.05% or more. However, when the content of Si is more than 1.00%, toughness and weldability are lowered. Accordingly, the content of Si is set to within a range of 0.05 to 1.00%. The content of Si is preferably set to 0.10% or more. Further, the content of Si is preferably set to 0.60% or less, and is more preferably set to 0.40% or less.

Mn: 0.05 to 1.20%

Mn has a deoxidation action, and also has an action of enhancing strength and hardenability. To obtain such advantageous effects, it is necessary to limit a content of Mn to 0.05% or more. However, when the content of Mn is more than 1.20%, toughness is lowered. Accordingly, the content of Mn is set to within a range of 0.05 to 1.20%. The content of Mn is preferably set to 0.30% or more, and is more preferably set to 0.60% or more. Further, the content of Mn is preferably set to 1.10% or less.

P: 0.025% or Less

When a content of P is more than 0.025%, toughness is remarkably lowered and hence, it is difficult to ensure a predetermined Charpy impact value. For this reason, the content of P as an impurity is set to 0.025% or less. The content of P is preferably set to 0.020% or less.

S: 0.005% or Less

When a content of S is more than 0.005%, toughness is remarkably lowered and hence, it is difficult to ensure a predetermined Charpy impact value. For this reason, the content of S as an impurity is set to 0.005% or less. The content of S is preferably set to 0.003% or less.

Cu: 0.20% or Less

When a content of Cu is more than 0.20%, hot workability may be lowered. For this reason, the content of Cu as an impurity is set to 0.20% or less. The content of Cu is preferably set to 0.15% or less, is more preferably set to 0.10% or less, and is further preferably set to 0.05% or less.

N: 0.007% or Less

When a content of N is more than 0.007%, coarse nitrides are formed, or it is difficult to ensure solid solution B. In such a case, particularly in a thick-wall steel pipe, B causes an insufficient effect of enhancing hardenability, so that a quenching structure cannot be sufficiently obtained, leading to remarkable lowering of toughness. Therefore, it is difficult to ensure a predetermined Charpy impact value. For this reason, the content of N as an impurity is set to 0.007% or less. The content of N is preferably set to 0.006% or less.

Ni: 0.20 to 0.50%

Ni has an action of enhancing hardenability, strength, and toughness. To obtain such advantageous effects, it is necessary to limit a content of Ni to 0.20% or more. However, when the content of Ni is more than 0.50%, an alloy cost is increased. Accordingly, the content of Ni is set to within a range of 0.20 to 0.50%. The content of Ni is preferably set to within a range of 0.30% or more and 0.40% or less.

Cr: 0.30% or More and Less Than 0.50%

Cr has an action of enhancing hardenability and strength. To obtain such advantageous effects, it is necessary to limit a content of Cr to 0.30% or more. However, in the case of low alloy steel that contains Cr and Mo in combination together with 0.0005 to 0.0020% of B, which will be described later, so as to ensure good hardenability, when the content of Cr is 0.50% or more, there may be cases in which coarse borocarbides are formed during tempering, thus causing the lowering of toughness. Further, Pcm (weld crack susceptibility composition) is increased, so that weld cracking is likely to occur. Accordingly, the content of Cr is set to within a range of 0.30% or more and less than 0.50%. The content of Cr is preferably set to 0.35% or more, and is more preferably set to 0.40% or more. Further, the content of Cr is preferably set to 0.47% or less, and is more preferably set to 0.45% or less.

Mo: 0.30 to 0.50%

Mo has an action of enhancing hardenability and strength. To obtain such advantageous effects, it is necessary to limit a content of Mo to 0.30% or more. However, in the case of low alloy steel that contains Mo and Cr in combination together with 0.0005 to 0.0020% of B, which will be described later, so as to ensure good hardenability, when the content of Mo is more than 0.50%, there may be cases in which coarse borocarbides are formed during tempering, thus causing the lowering of toughness. Further, Pcm (weld crack susceptibility composition) is increased, so that weld cracking is likely to occur. Accordingly, the content of Mo is set to within a range of 0.30 to 0.50%. The content of Mo is preferably set to 0.35% or more, and is more preferably set to 0.40% or more. Further, the content of Mo is preferably set to 0.48% or less, and is more preferably set to 0.46% or less.

Nb: 0.01 to 0.05%

Nb is combined with C or/and N to form fine precipitates, thus having an action of enhancing toughness by suppressing coarsening of austenite grains. To stably ensure such an advantageous effect, it is necessary to limit a content of Nb to 0.01% or more. However, when the content of Nb is more than 0.05%, the amount of precipitates is increased, so that there may be cases in which toughness deteriorates instead. Accordingly, the content of Nb is set to within a range of 0.01 to 0.05%. The content of Nb is preferably set to within a range of 0.02% or more and 0.04% or less.

Al: 0.001 to 0.100%

Al is an element having a deoxidation action. To ensure such an advantageous effect, it is necessary to limit a content of Al to 0.001% or more. However, even when the content of Al is set to more than 0.100%, the above-mentioned advantageous effect is saturated, and the number of macro-streak-flaws increases. Accordingly, the content of Al is set to within a range of 0.001 to 0.100%. The content of Al is preferably set to 0.055% or less. In the present invention, the content of Al refers to a content of acid soluble Al (so-called "sol.Al").

B: 0.0005 to 0.0020%

B is an extremely important element to make a thick-wall steel pipe sufficiently have a quenching structure, Pcm in the thick-wall steel pipe being suppressed to a low value of 0.30 or less from the viewpoint of weldability. Thus, it is necessary to limit a content of B to 0.0005% or more. However, in the case in which Cr and Mo are contained in combination, even when the content of Cr is less than 0.50% and the content of Mo is 0.50% or less, the content of B of more than 0.0020% may form coarse borocarbides during tempering, thus causing the lowering of toughness. Accordingly, the content of B is set to within a range of 0.0005 to 0.0020%. The content of B is preferably set to within a range of 0.0008% or more and 0.0016% or less.

Ti: 0.003 to 0.050%

Ti precipitates as Ti carbides during tempering, thus having an action of enhancing strength. Ti also has an action of ensuring solid solution B by immobilizing N, the solid solution B being effective in making B exhibit an effect of improving hardenability. Such advantageous effects can be obtained when a content of Ti is 0.003% or more. However, when the content of Ti is more than 0.050%, coarse Ti carbo-nitrides are formed in a high temperature range, such as during solidification, and the amount of precipitation of Ti carbides is excessively increased during tempering and hence, toughness is lowered. Accordingly, the content of Ti is set to within a range of 0.003 to 0.050%. The content of Ti is preferably set to within a range of 0.005% or more and 0.015% or less.

Further, to immobilize N as described above, it is preferable to satisfy $Ti/N \geq 48/14$.

V: 0.01 to 0.20%

V precipitates as V carbides during tempering, thus having an action of enhancing strength. Such an advantageous effect can be obtained when a content of V is 0.01% or more. However, when the content of V is more than 0.20%, the amount of precipitation of V carbides is excessively increased during tempering and hence, toughness is lowered. Further, Pcm is increased, so that weld cracking is likely to occur. Accordingly, the content of V is set to within a range of 0.01 to 0.20%. The content of V is preferably set to 0.04% or more. Further, the content of V is preferably set to 0.15% or less, and is more preferably set to 0.10% or less.

Total of Any One or More Selected from Ca, Mg, and REM: 0 to 0.0250%

Each of Ca, Mg, and REM reacts with S to form sulfides, thus having an action of enhancing toughness by improving morphology of inclusions. Therefore, any one or more selected from Ca, Mg, and REM may be contained when necessary. To stably obtain such an advantageous effect, a content of these components in total is preferably set to 0.0005% or more. However, when the total content of these components is more than 0.0250%, the amount of inclusion is increased, thus causing the lowering of cleanliness of steel, so that toughness is lowered instead. Accordingly, the upper limit of the total content of these elements is set to 0.0250%. The total content is preferably set to 0.0100% or less, is more preferably set to 0.0080% or less, and is further preferably set to 0.0050% or less.

In the present invention, "REM" refers to a total of seventeen elements including Sc, Y, and lanthanoid. When one kind of REM is contained, "content of REM" refers to a content of REM. When two or more kinds of REM are contained, "content of REM" refers to the total content of REMs. In general, REM is also supplied as misch metal, which is an alloy of REM of multiple kinds. Therefore, one kind or two or more kinds of individual element may be additionally contained, or may be added in the form of misch metal, for example.

The base metal portion according to the present invention is made of the respective elements described above and the balance consisting of Fe and impurities. In the present embodiment, the term "impurities" means components which are mixed into a steel material due to various causes, such as a raw material including ore or scrap, or production steps, in industrially producing the steel material, and which are allowed within a range where the impurities do not adversely affect the present invention.

Pcm: 0.25 to 0.30

In the base metal portion according to the present invention, Pcm expressed by the following formula [A] is set to within a range of 0.25 to 0.30. When Pcm is less than 0.25, it is difficult to ensure sufficient joint strength. However, by setting Pcm to 0.30 or less, it is possible to prevent cold cracking in the girth welded portion:

$$Pcm = C + (Si/30) + (Mn/20) + \quad\quad\quad [A]$$
$$(Cu/20) + (Ni/60) + (Cr/20) + (Mo/15) + (V/10) + 5B$$

where each symbol of an element in the formula [A] denotes a content (mass %) of the element contained in steel, and 0 is given when the element is not contained in the steel.

(C) Chemical Composition of Weld Metal Portion

The reasons for limiting the chemical composition of the weld metal portion are as follows. In the description made hereinafter, symbol "%" for a content of each element refers to "mass %". In the present embodiment, the chemical composition of the weld metal portion refers to the chemical composition of a root pass welded zone.

C: 0.04 to 0.14%

C is an indispensable element for increasing strength. However, when a content of C is more than 0.14%, weldability is remarkably lowered. Accordingly, the content of C is set to within a range of 0.04 to 0.14%. The content of C is preferably set to within a range of 0.06% or more and 0.12% or less.

Si: 0.05 to 1.00%

Si is an element having an action of enhancing strength. To obtain such an advantageous effect, it is necessary to set a content of Si to 0.05% or more. However, when the content of Si is more than 1.00%, toughness is lowered. Accordingly, the content of Si is set to within a range of 0.05 to 1.00%. The content of Si is preferably set to within a range of 0.10% or more and 0.60% or less.

Mn: 1.00 to 2.00%

Mn is an element having an action of enhancing strength. To obtain such an advantageous effect, it is necessary to limit a content of Mn to 1.00% or more. However, when the content of Mn is more than 2.00%, toughness is lowered. Accordingly, the content of Mn is set to within a range of 1.00 to 2.00%. The content of Mn is preferably set to within a range of 1.20% or more and 1.80% or less.

P: 0.025% or Less

When a content of P is more than 0.025%, toughness is remarkably lowered and hence, it is difficult to ensure a predetermined Charpy impact value. For this reason, the content of P as an impurity is set to 0.025% or less. The content of P is preferably set to 0.020% or less.

S: 0.005% or Less

When a content of S is more than 0.005%, toughness is remarkably lowered and hence, it is difficult to ensure a predetermined Charpy impact value. For this reason, the content of S as an impurity is set to 0.005% or less. The content of S is preferably set to 0.003% or less.

Cu: 0.50% or Less

When a content of Cu is more than 0.50%, toughness may be lowered. For this reason, the content of Cu as an impurity is set to 0.50% or less. The content of Cu is preferably set to 0.40% or less, and is more preferably set to 0.30% or less.

N: 0.007% or Less

When a content of N is more than 0.007%, coarse nitrides are formed, thus causing remarkable lowering of toughness and hence, it is difficult to ensure a predetermined Charpy impact value. For this reason, the content of N as an impurity is set to 0.007% or less. The content of N is preferably set to 0.006% or less.

Ni: 2.50 to 3.00%

Ni has an action of enhancing strength and toughness. To obtain such advantageous effects, it is necessary to limit a content of Ni to 2.50% or more. However, when the content of Ni is more than 3.00%, an alloy cost is increased. Accordingly, the content of Ni is set to within a range of 2.50 to 3.00%. The content of Ni is preferably set to within a range of 2.60% or more and 2.80% or less.

Cr: 0.90% or More and Less than 1.40%

Cr has an action of enhancing strength. To obtain such an advantageous effect, it is necessary to limit a content of Cr to 0.90% or more. However, when the content of Cr is 1.40% or more, toughness may be lowered. Accordingly, the content of Cr is set to within a range of 0.90% or more and less than 1.40%. The content of Cr is preferably set to 1.00% or more. Further, the content of Cr is preferably set to 1.30% or less, and is more preferably set to 1.20% or less.

Mo: 0.40 to 0.90%

Mo has an action of enhancing strength. To obtain such an advantageous effect, it is necessary to limit a content of Mo to 0.40% or more. However, when the content of Mo is more than 0.90%, toughness may be lowered. Accordingly, the content of Mo is set to within a range of 0.40 to 0.90%. The content of Mo is preferably set to 0.50% or more. The content of Mo is preferably set to 0.80% or less, and is preferably set to 0.70% or less.

Nb: 0.010% or Less

Nb is an element that may be mixed from the base metal portion. However, when a content of Nb is more than 0.010%, there may be cases in which toughness deteriorates. Accordingly, the content of Nb is set to 0.010% or less. The content of Nb is preferably set to 0.008% or less, and is more preferably set to 0.005% or less.

Al: 0.010% or Less

Al is an element that is inevitably mixed from the base metal portion. However, when a content of Al is more than 0.010%, toughness is lowered. Accordingly, the content of Al is set to 0.010% or less. The content of Al is preferably set to 0.008% or less, and is more preferably set to 0.005% or less. In the present invention, the content of Al refers to a content of acid soluble Al (so-called "sol.Al").

B: 0.0010% or Less

B is an element that is inevitably mixed from the base metal portion. However, when a content of B is more than 0.0010%, solidification cracking may occur in the weld metal portion. Accordingly, the content of B is set to 0.0010% or less. The content of B is preferably set to as a low value as possible, is preferably set to 0.0007% or less, is more preferably set to 0.0005% or less, and is further preferably set to 0.0003% or less. In contrast, in the case of aiming at enhancement of strength of the weld metal portion, B may be actively contained. To obtain such an advantageous effect, the content of B is preferably set to 0.0001% or more, and is more preferably set to 0.0003% or more.

Ti: 0.003 to 0.050%

Ti has an action of enhancing strength. Such an advantageous effect can be obtained when a content of Ti is 0.003% or more. However, when the content of Ti is more than 0.050%, toughness is lowered. Accordingly, the content of Ti is set to within a range of 0.003 to 0.050%. The content of Ti is preferably set to within a range of 0.005% or more and 0.015% or less.

V: 0.01 to 0.20%

V has an action of enhancing strength. Such an advantageous effect can be obtained when a content of V is 0.01% or more. However, when the content of V is more than 0.20%, toughness is lowered. Accordingly, the content of V is set to within a range of 0.01 to 0.20%. The content of V is preferably set to within a range of 0.04% or more and 0.15% or less.

Total of Any One or More Selected from Ca, Mg, and REM: 0 to 0.0250%

Each of Ca, Mg, and REM reacts with S to form sulfides, thus having an action of enhancing toughness by improving morphology of inclusions. Therefore, any one or more selected from Ca, Mg, and REM may be contained when necessary. To stably obtain such an advantageous effect, a content of these components in total is preferably set to 0.0005% or more. However, when the total content of these components is more than 0.0250%, the amount of inclusions is increased, thus causing the lowering of cleanliness of steel, so that toughness is lowered instead. Accordingly, the upper limit of the total content of these elements is set to 0.0250%. The total content is preferably set to 0.0100% or less, and is more preferably set to 0.0050% or less.

The weld metal portion according to the present invention is made of the respective elements described above and the balance consisting of Fe and impurities. In the present embodiment, the term "impurities" means components which are mixed into a steel material due to various causes, such as a raw material including ore or scrap, or production steps, in industrially producing the steel material, and which are allowed within a range where the impurities do not adversely affect the present invention.

(D) Metallographic Micro-Structure of Base Metal Portion

To achieve both high strength and high toughness of the base metal portion according to the present invention, it is desirable that the base metal portion has a metallographic micro-structure that is mainly composed of tempered martensite. Specifically, it is desirable that the area fraction of tempered martensite be 90% or more. Although the micro-structure of the balance is not particularly limited, one or more selected from bainite, ferrite, and pearlite may be included.

In the present invention, the metallographic micro-structure is measured by the following method. First, an observation specimen is sampled from a base metal portion such that the observation specimen includes the center portion in the wall thickness direction of a steel pipe and a cross section perpendicular to the rolling direction forms an observation surface. In the case in which the steel pipe is a welded steel pipe, an observation specimen is sampled at a position 180° away from a welded zone in the circumferential direction of the steel pipe. In the description made hereinafter, to distinguish a welded zone of the welded steel pipe that extends in the longitudinal direction of the steel pipe from the above-mentioned "girth welded portion", the welded zone that extends in the longitudinal direction of the steel pipe is referred to as "longitudinal-direction welded zone". After the observation surface is polished, nital etching is performed on the observation surface. Thereafter, the area fraction of tempered martensite is obtained from a photograph of a micro-structure photographed by an optical microscope with magnification 500×.

(E) Mechanical Properties

In the girth welded joint of steel pipe according to the present invention, each of tensile strength of the base metal portion and tensile strength of the girth welded portion in a cross weld tensile test (hereinafter both will be referred to as "TS") is 980 MPa or more. The base metal portion and the girth welded portion each having TS of 980 MPa or more allow a stable reduction in weight and hence, the girth welded joint of steel pipe according to the present invention can be sufficiently stably used for a crane boom that can cope with an increase in size of a crane.

The lower limit of TS of each of the base metal portion and the girth welded portion is preferably set to 1000 MPa. The upper limit of TS of each of the base metal portion and the girth welded portion is preferably set to 1100 MPa. In the girth welded joint of steel pipe according to the present invention, each of yield stress of the base metal portion and yield stress of the girth welded portion in a cross weld tensile test (hereinafter both will be referred to as "YS") is preferably set to 890 MPa or more, and is more preferably set to 900 MPa or more.

In the present invention, tensile strength and yield stress of the base metal portion are measured such that a No. 12B test coupon (an arc-shaped test coupon having a width of 25 mm) as described in JIS Z 2241:2011 is cut out from the base metal portion, and is subjected to a tensile test in the atmosphere at room temperature. Tensile strength of the girth welded portion in a cross weld tensile test and yield stress are measured by using a No. 3 test coupon (the width of a parallel portion: 20 mm) that is in accordance with JIS Z 3121:2013, and that is sampled such that the length direction of the No. 3 test coupon aligns with the longitudinal direction of the girth welded joint of steel pipe and the girth welded portion is located at the center of the parallel portion. That is, strength of the girth welded portion is effectively joint strength. In the case in which the base metal portion is a welded steel pipe, a test coupon for a tensile test is sampled at a position 180° away from the longitudinal-direction welded zone in the circumferential direction of the steel pipe.

To achieve the above-mentioned joint strength, it is necessary to suppress softening in the weld heat affected zone as much as possible. For this reason, in the present invention, the average hardness of the base metal portion is set to 300 HV10 or more, the average softening width of the weld heat affected zone is set to 4.0 mm or less, and the average softening degree is set to 80 HV10 or less.

It is not particularly necessary to provide a limit to the maximum hardness of the weld heat affected zone. However, from the viewpoint of suppressing cold cracking, the maximum hardness of the weld heat affected zone is preferably set to 415 HV10 or less.

In the present invention, "the average hardness of the base metal portion", "the average softening width of the weld heat affected zone", "the average softening degree of the weld heat affected zone", and "the maximum hardness of the weld heat affected zone" are obtained by the following procedures.

Hardness is measured at three points on the cross section perpendicular to the longitudinal direction of the steel pipe, that is, at a position 1.0 mm away from the outer surface of the base metal portion, a center position in the wall thickness direction, and a position 1.0 mm away from the inner surface of the base metal portion. The average hardness of the base metal portion is obtained by calculating the average value of the respective measured values.

Figure 2:
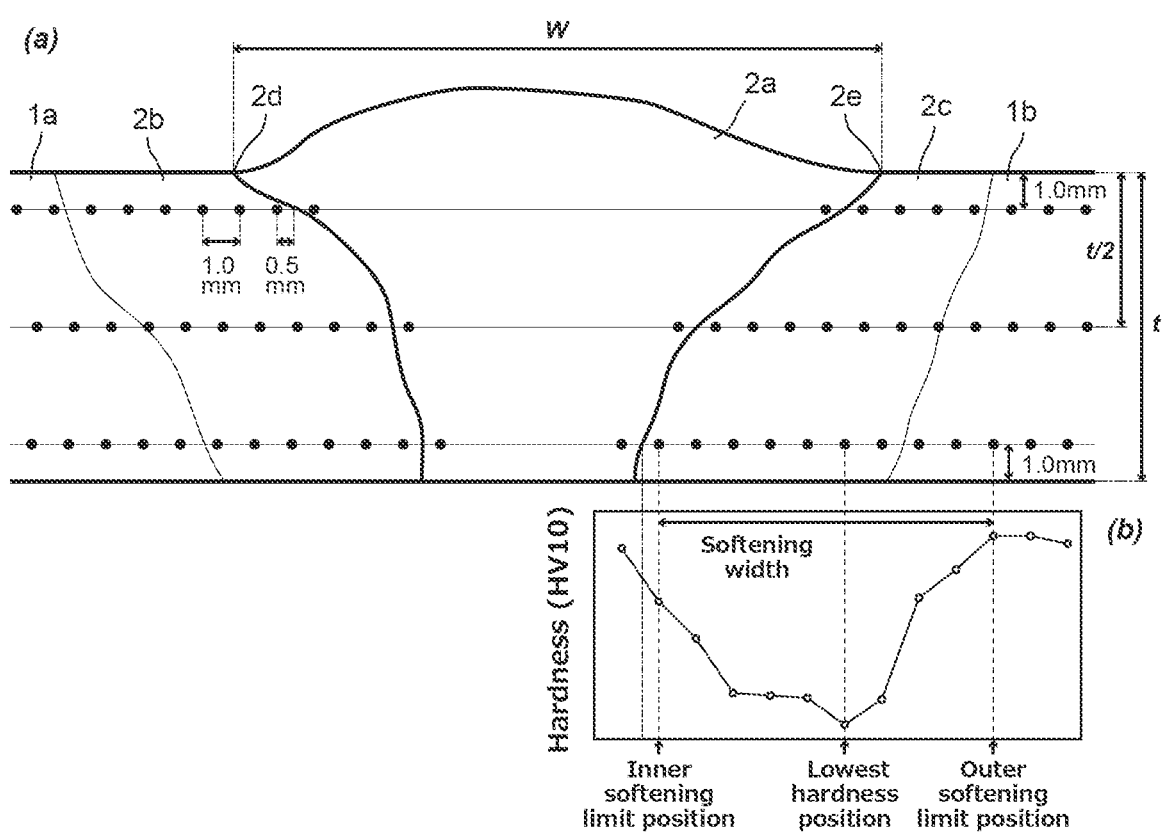
FIG. 2 is a diagram illustrating a method for measuring an average softening width and an average softening degree of a weld heat affected zone.

FIG. 2 is a diagram illustrating a method for measuring the average softening width and the average softening degree of the weld heat affected zone. As shown in FIG. 2a, a cross section is cut out that includes the base metal portions 1a, 1b, the weld metal portion 2a, and the weld heat affected zones 2b, 2c, that passes through the axis of the steel pipe, and that is parallel to the longitudinal direction of the steel pipe.

Then, hardness is measured at intervals of 1.0 mm on each of three lines that respectively pass through the position 1.0 mm away from the outer surface, the center position in the wall thickness direction, and the position 1.0 mm away from the inner surface, and that are parallel to the longitudinal direction of the steel pipe. In performing the measurement, measurement points are set in such a way as to include positions 0.5 mm away from a boundary between the weld metal portion 2a and the weld heat affected zone 2b toward the base metal portion 1a and include positions 0.5 mm away from a boundary between the weld metal portion 2a and the weld heat affected zone 2c toward the base metal portion 1b.

Thereafter, as shown in FIG. 2b, a measurement point having the lowest hardness is specified, and is taken as the position having the lowest hardness. In the case in which there are a plurality of measurement points having the lowest hardness, a measurement point closest to the base metal portion 1b among such measurement points is taken as the position having the lowest hardness. A difference between the average hardness of the base metal portion and hardness at the position having the lowest hardness is taken as a softening degree.

Subsequently, within a region toward the base metal portion 1b from the position having the lowest hardness to the point at which the lowering of hardness is started, among measurement points which are on base metal portion-1b side and each of which has a difference in hardness of 10 HV or more with an adjacent measurement point, a measurement point that is farthest from the weld metal portion 2a is specified, and is taken as an outer softening limit position.

Next, within a region from the position having the lowest hardness to the boundary between the weld metal portion 2a and the weld heat affected zone 2c, a measurement point having hardness closest to hardness at the outer softening limit position is specified, and is taken as an inner softening limit position. A distance from the outer softening limit position to the inner softening limit position in the direction parallel to the longitudinal direction of the steel pipe is taken as a softening width.

The above-mentioned softening degree and softening width are measured at six positions in total, that is, at the position 1.0 mm away from the outer surface, the center position in the wall thickness direction, and the position 1.0 mm away from the inner surface on both the weld heat affected zone 2b side and the weld heat affected zone 2c side. The average value of the measured softening widths is taken as the average softening width of the weld heat affected zone, and the average value of the measured softening degrees is taken as the average softening degree of the weld heat affected zone.

Of all measured values of hardness of the weld heat affected zones 2b, 2c, the maximum value is taken as the maximum hardness of the weld heat affected zone. Symbol "HV10" refers to "hardness symbol" when a Vickers hardness test is performed with a test force of 98N (10 kgf) (see JIS Z 2244-1:2020).

In the girth welded joint of steel pipe according to the present invention, a Charpy impact value of the base metal portion at $-40°$ C. is preferably set to 75 $J/cm^2$ or more. The girth welded joint of steel pipe having a Charpy impact value at $-40°$ C. of 75 $J/cm^2$ or more can be sufficiently stably used for a crane boom that is used for operation in cold locations. The lower limit of a Charpy impact value at $-40°$ C. of the seamless steel pipe is more preferably set to 125 $J/cm^2$, and is preferably set to as a high value as possible.

(F) Wall Thickness

The wall thickness of the base metal portion of the girth welded joint of steel pipe according to the present invention is not particularly limited. However, when the wall thickness of the base metal portion is more than 45.0 mm, bainite is easily generated in the base metal portion, so that it is difficult to obtain a micro-structure that is mainly composed of tempered martensite. Accordingly, the wall thickness of the base metal portion is preferably set to 45.0 mm or less, and is more preferably set to 40.0 mm or less, 30.0 mm or less, or 20.0 mm or less. In contrast, from the viewpoint of ensuring strength of the girth welded joint of steel pipe, a thicker wall is more advantageous. For this reason, the wall thickness of the base metal portion is preferably set to 5.0 mm or more, is more preferably set to more than 8.0 mm, and is further preferably set to more than 12.0 mm. The reason for this is that there is a tendency for a base metal portion having a thicker wall to increase strength of a girth welded joint of steel pipe due to suppression of HAZ softening with an increase in cooling rate after welding and due to an increase in binding force with respect to deformation.

(G) Method for Producing Base Metal Portion

The base metal portion used in producing the girth welded joint of steel pipe according to the present invention can be produced by the following method, for example. In the description made hereinafter, the case in which the base metal portion is a seamless steel pipe is taken as an example. However, the base metal portion is not limited to a seamless steel pipe.

Steel having the chemical composition described in the section (B) is melted by a method substantially equal to the method for general low alloy steel and, thereafter, is formed into an ingot or a cast piece by casting. Steel may be formed into a cast piece having a circular billet shape for pipe-making by a so-called "round continuous casting" method.

In the next step, the casted ingot or cast piece is subjected to blooming or hot forging. This step is a step of obtaining a stock used in final hot rolling (for example, pipe-making by hot piercing, rolling, and elongating step, or pipe-making by hot extrusion press). The cast piece formed into a circular billet shape by the "round continuous casting" method can be directly finished into a seamless steel pipe alone and hence, it is not always necessary to apply blooming or hot forging to the cast piece.

The stock that is produced by the blooming or hot forging and that is used in final hot rolling, and the cast piece that is formed into a circular billet shape (hereinafter referred to as "billet") are subjected to steps [i] to [iv] described below in order so as to produce a seamless steel pipe of the present invention.

[i]: Hot Rolling Step in which Billet is Heated to 1200 to 1300° C. and, thereafter, is Subjected to Working at Area Reduction Ratio of 40 to 99% to Produce Hollow Shell The above-described billet is heated to 1200 to 1300° C. and, thereafter, is subjected to working at an area reduction ratio of 40 to 99% to produce a hollow shell having a predetermined shape. When a heating temperature of the billet is less than 1200° C., deformation resistance increases in performing next working at an area reduction ratio of 40 to 99%, so that a pipe-making facility receives a large load, and working defects, such as flaws or cracks, may be formed. In contrast, when the heating temperature of the billet is more than 1300° C., high-temperature grain boundary cracks or the lowering of ductility may occur. Accordingly, first, the heating temperature of the billet is set to within a range of 1200 to 1300° C. in the hot rolling step.

Assume a case in which the heating temperature of the billet falls within the above-mentioned range, but an area reduction ratio in hot rolling after heating is less than 40%. In such a case, even when the step [ii], that is, a cooling step which will be described later, is performed, there may be cases in which a fine quenching structure cannot be obtained in the step [iii], that is, a quenching step, so that it is not possible to make the seamless steel pipe have desired mechanical properties. However, a hot rolling step in which working is performed at an area reduction ratio of more than 99% may require extension of a pipe-making facility. Accordingly, in the hot rolling step, working is performed at an area reduction ratio of 40 to 99%.

The heating temperature in the step [i] refers to the temperature of the billet on the surface of the billet. A holding time within the above-mentioned temperature range is preferably set to within a range of 60 to 300 minutes, although this depends on the size and shape of the billet. Further, a hollow shell finishing temperature in hot rolling is preferably set to within a range of 850 to 950° C. This hollow shell finishing temperature refers to the temperature of the hollow shell on the outer surface of the hollow shell. In the step [i], the lower limit of the heating temperature is preferably set to 1230° C., and the upper limit of the heating temperature is preferably set to 1280° C. Further, the lower limit of the area reduction ratio is preferably set to 50%, and the upper limit of the area reduction ratio is preferably set to 90%.

[ii]: Cooling Step in which the Hollow Shell is Cooled to Temperature of Less Than $Ac_1$ Point The hollow shell that is finished into the predetermined shape is cooled to a temperature of less than the $Ac_1$ point so as to obtain a fine quenching structure in the step [iii], that is, the quenching step. A cooling rate in this operation is not particularly limited. Note that a configuration may be adopted in which the hollow shell that is subjected to hot rolling is cooled to room temperature once and, thereafter, is heated again to perform the next step [iii]. Alternatively, a configuration may be adopted in which, after the hollow shell is subjected to hot rolling, the hollow shell is cooled to a suitable temperature of less than the $Ac_1$ point and, thereafter, is directly heated from such a temperature to perform the next step [iii]. The cooling temperature in the step [ii] refers to the temperature of the hollow shell on the outer surface of the hollow shell.

[iii]: Quenching Step in which Cooled Hollow Shell is Heated to $Ac_3$ Point to 950° C. And, Thereafter, is Rapidly Cooled Next, the hollow shell that is cooled in the step [ii] is subjected to quenching treatment, in which the hollow shell is heated to a temperature of the $Ac_3$ point to 950° C. and, thereafter, is rapidly cooled. When the heating temperature is less than the $Ac_3$ point, austenitization is not completed and hence, there may be cases in which it is not possible to make the seamless steel pipe have predetermined mechanical properties. In contrast, when the heating temperature is more than 950° C., performing quenching treatment only one time does not allow the seamless steel pipe to obtain fine austenite grains, so that there may be cases in which it is not possible to make the seamless steel pipe have predetermined mechanical properties. Accordingly, the heating temperature during quenching treatment is set to within a range of the $Ac_3$ point to 950° C.

A holding time at the heating temperature is preferably set to 5 to 30 minutes, although this depends on the size of the hollow shell. Provided that substantially uniform heating can be achieved, short-time rapid heating treatment that uses induction heating may be adopted. The heating temperature in the step [iii] refers to the temperature of the hollow shell on the outer surface of the hollow shell. Provided that a quenching structure can be sufficiently obtained, a suitable method, such as water cooling or oil cooling, may be used for rapid cooling. In the step [iii], the lower limit of the heating temperature is preferably set to 880° C., and the upper limit of the heating temperature is preferably set to 920° C.

[iv]: Tempering Step in which Quenched Hollow Shell is Heated to 500 To 600° C. and, thereafter, is Cooled to Room Temperature To make the hollow shell, which is quenched in the step [iii], have predetermined mechanical properties required as a seamless steel pipe, the hollow shell is subjected to tempering treatment in which the hollow shell is heated to 500 to 600° C. and, thereafter, is cooled to room temperature. In the case in which the hollow shell has the chemical composition described in the section (B), when the heating temperature in tempering is less than 500° C., there may be cases in which although predetermined strength (TS) can be ensured, low-temperature toughness is lowered, thus causing a Charpy impact value at −40° C. of less than 75 J/cm². In contrast, when the heating temperature in tempering is more than 600° C., there may be cases in which although predetermined low-temperature toughness (a Charpy impact value at −40° C.) can be obtained, strength is lowered, so that high strength, that is, TS of 980 MPa or more, cannot be ensured. Accordingly, the heating temperature in tempering treatment is set to within a range of 500 to 600° C.

A holding time at the heating temperature is preferably set to within a range of 30 to 60 minutes, although this depends on the size of the hollow shell. The heating temperature in the step [iv] refers to the temperature of the hollow shell on the outer surface of the hollow shell. A cooling rate in the tempering treatment is not particularly limited. Therefore, it is sufficient to perform cooling, such as air-cooling in the atmosphere, forced air-cooling, mist cooling, oil cooling, or water cooling, according to the facility. In the step [iv], the lower limit of the heating temperature is preferably set to 525° C., and the upper limit of the heating temperature is preferably set to 575° C.

(H) Method for Producing Girth Welded Joint of Steel Pipe

By performing girth welding by using a welding material, such as a solid wire or a flux-cored wire, in a state in which the pipe ends of the base metal portions produced by the above-mentioned method are butted against each other, it is possible to produce the girth welded joint of steel pipe.

To suppress softening in the weld heat affected zone, it is necessary to perform welding at a low heat input. Further, to increase production efficiency, even in the case in which root pass welding is performed at a low heat input, in general, the heat input is gradually increased for the second and following layers. However, in the present invention, from the viewpoint of ensuring joint strength, welding is performed at a low heat input of 0.5 kJ/mm or less for the layers ranging from the root pass to the last layer.

In addition, welding is performed at a low heat input for the layers ranging from the root pass to the last layer and hence, it is possible to suppress inflow of an alloying element from the base metal portion to the weld metal portion to a minimum level and, particularly, it is possible to reduce the content of B in the weld metal portion. Therefore, it is possible to suppress occurrence of hot cracking, such as solidification cracking.

In normal working, preheating is performed before welding so as to prevent cold cracking. However, in the present invention, preheating is not performed so as to suppress softening in the weld heat affected zone, and an inter-pass temperature is controlled to a relatively low temperature. Specifically, the inter-pass temperature is set to 150° C. or less.

General conditions may be adopted for other welding conditions, and gas shield arc welding is used, for example. In this case, current value, voltage value, welding speed, and shield gas in welding can be suitably selected from a known technique. Although the kind of welding material is also not particularly limited, it is necessary to select a welding material that makes the chemical composition of the weld metal portion satisfy the above-mentioned definition.

In performing girth welding, it is preferable to perform multilayer welding. In the case in which the wall thickness is 5.0 mm or more, it is difficult for normal gas shield arc welding, for example, to achieve welding with only one layer. If laser welding is used, for example, it is possible to achieve welding with only one layer. However, in such a case, it is necessary to adopt a large heat input, or it is necessary to reduce a separation between bevels and to reduce a groove angle. In the former case, as described above, B noticeably flows into the weld metal portion from the base metal portion and hence, the former case is not preferable.

In contrast, when a separation between bevels is reduced and a groove angle is reduced, there is a possibility that weld defects occur, thus causing the lowering of fatigue strength of the joint. Therefore, from the viewpoint of ensuring fatigue strength of the joint, it is preferable to perform multilayer welding after a sufficient separation is ensured between bevels. That is, it is preferable that the weld metal portion be multi-pass weld metal.

Due to substantially the same reason, a width W of the weld metal portion shown in FIG. 2 is preferably set to more than 7.0 mm, and is more preferably set to 9.0 mm or more. A method for measuring the width W of the weld metal portion will be described with reference to FIG. 2. As shown in FIG. 2, on the cross section that passes through the axis of the steel pipe, and that is parallel to the longitudinal direction of the steel pipe, an intersection $2d$ is specified at which the boundary between the weld metal portion $2a$ and the weld heat affected zone $2b$ intersects with the outer surface of the girth welded joint of steel pipe. In the same manner, an intersection $2e$ is specified at which the boundary between the weld metal portion $2a$ and the weld heat affected zone $2c$ intersects with the outer surface of the girth welded joint of steel pipe. A distance between the intersection $2d$ and the intersection $2e$ in the longitudinal direction of the steel pipe is the width W of the weld metal portion.

Hereinafter, the present invention will be described more specifically with reference to examples. However, the present invention is not limited to these examples.

EXAMPLE 1

Steels A to H having the chemical compositions shown in Table 1 were melted, and were subjected to a converter-continuous casting process to cast rectangular billets. Further, the rectangular billets were shaped into circular billets by hot forging, and were then cooled to room temperature.

The steels A to E in Table 1 are steels in which the chemical composition falls within a range defined in the present invention. In contrast, steels F to H are steels in which the chemical composition falls outside the conditions defined in the present invention. Table 1 also shows $Ac_1$ point and $Ac_3$ point obtained from the following formula (i) and formula (ii).

$$Ac_1 \text{ point } (° \text{ C.}) = 723 + 29.1 \times Si - 10.7 \times Mn - 16.9 \times Ni + 16.9 \times Cr \quad \text{(i)}$$

$$Ac_3 \text{ point } (° \text{ C.}) = 910 - 203 \times C^{0.5} + 44.7 \times Si - 15.2 \times Ni + 31.5 \times Mo + 104 \times V - (30 \times Mn + 11 \times Cr + 20 \times Cu - 700 \times P - 400 \times Al - 400 \times Ti) \quad \text{(ii)}$$

[Table 1]

TABLE 1

| Steel | Chemical composition of base metal portion (mass %, balance: Fe and impurities) | | | | | | | | | | |
|---|---|---|---|---|---|---|---|---|---|---|---|
| | C | Si | Mn | P | S | Cu | N | Ni | Cr | Mo | Nb |
| A | 0.14 | 0.29 | 0.98 | 0.010 | 0.002 | 0.02 | 0.004 | 0.37 | 0.43 | 0.46 | 0.03 |
| B | 0.16 | 0.17 | 1.03 | 0.020 | 0.001 | 0.01 | 0.002 | 0.34 | 0.43 | 0.45 | 0.03 |
| C | 0.14 | 0.14 | 1.00 | 0.013 | 0.001 | 0.01 | 0.002 | 0.36 | 0.44 | 0.45 | 0.03 |

TABLE 1-continued

| D | 0.13 | 0.14 | 0.96 | 0.010 | 0.001 | 0.01 | 0.002 | 0.35 | 0.44 | 0.45 | 0.02 |
| E | 0.14 | 0.30 | 0.99 | 0.011 | 0.002 | 0.02 | 0.004 | 0.37 | 0.43 | 0.46 | 0.03 |
| F | 0.12 | 0.09 | 0.98 | 0.012 | 0.003 | 0.01 | 0.004 | 0.35 | 0.45 | 0.50 | 0.02 |
| G | 0.17 | 0.29 | 1.12 | 0.017 | 0.002 | 0.05 | 0.007 | 0.10 | 1.42 | 0.50 | — |
| H | 0.14 | 0.29 | 1.05 | 0.014 | 0.002 | 0.05 | 0.006 | 0.10 | 1.43 | 0.50 | — |

| | Chemical composition of base metal portion (mass %, balance: Fe and impurities) | | | | | | | | $Ac_1$ | $Ac_3$ |
| Steel | Al | B | Ti | V | Ca | Mg | REM | Pcm | point | point |
|---|---|---|---|---|---|---|---|---|---|---|
| A | 0.040 | 0.0016 | 0.009 | 0.05 | 0.0022 | — | — | 0.27 | 712 | 853 |
| B | 0.003 | 0.0019 | 0.010 | 0.05 | 0.0023 | — | — | 0.29 | 708 | 834 |
| C | 0.002 | 0.0013 | 0.005 | 0.05 | 0.0018 | — | — | 0.26 | 707 | 831 |
| D | 0.002 | 0.0010 | 0.005 | 0.05 | 0.0012 | — | — | 0.25 | 708 | 833 |
| E | 0.004 | 0.0016 | 0.008 | 0.05 | 0.0020 | 0.0005 | 0.0005 | 0.27 | 712 | 839 |
| F | 0.039 | 0.0011 | 0.007 | 0.05 | 0.0022 | — | — | 0.24 | 706 | 852 |
| G | 0.039 | 0.0002 | 0.004 | 0.06 | 0.0001 | — | — | 0.35 | 727 | 839 |
| H | 0.043 | 0.0002 | 0.004 | 0.06 | 0.0001 | — | — | 0.32 | 728 | 848 |

The above-mentioned circular billets were heated at 1240° C., and two seamless steel pipes having an outer diameter of 114.3 mm and a wall thickness of 8.6 mm were prepared from each circular billet by a Mannesmann-mandrel process such that a finishing temperature falls within a range of 850 to 950° C. Thereafter, the seamless steel pipes were cooled to room temperature. The reason why the steel surface was polished and, thereafter, was subjected to nital etching. Thereafter, the area fraction of tempered martensite was obtained from a photograph of a micro-structure photographed by an optical microscope with magnification 500×.

[Table 2]

TABLE 2

| | | Quenching | | Tempering | | Base metal portion | | | Welding condition | | |
| Test No. | steel | Heating temperature (° C.) | Holding time (min) | Heating temperature (° C.) | Holding time (min) | Outer diameter (mm) | Wall thickness (mm) | Tempered martensite area fraction[#1] (%) | Maximum heat input (kJ/mm) | Average heat input (kJ/mm) | Inter-pass temperature (° C.) |
|---|---|---|---|---|---|---|---|---|---|---|---|
| 1 | A | 920 | 10 | 525 | 30 | 114.3 | 8.6 | ≥90 | 0.49 | 0.48 | 120 |
| 2 | B | 920 | 10 | 550 | 30 | 114.3 | 8.6 | ≥90 | 0.49 | 0.47 | 115 |
| 3 | C | 920 | 10 | 525 | 30 | 114.3 | 8.6 | ≥90 | 0.48 | 0.44 | 110 |
| 4 | D | 920 | 10 | 500 | 30 | 114.3 | 8.6 | ≥90 | 0.49 | 0.48 | 122 |
| 5 | E | 920 | 10 | 525 | 30 | 114.3 | 8.6 | ≥90 | 0.49 | 0.48 | 124 |
| 6 | F | 920 | 10 | 500 | 30 | 114.3 | 8.6 | ≥90 | 0.48 | 0.45 | 112 |
| 7 | G | 920 | 10 | 575 | 30 | 114.3 | 8.6 | ≥90 | 0.49 | 0.47 | 119 |
| 8 | G | 920 | 10 | 500 | 30 | 114.3 | 8.6 | ≥90 | 0.49 | 0.47 | 120 |
| 9 | H | 920 | 10 | 575 | 30 | 114.3 | 8.6 | ≥90 | 0.49 | 0.47 | 113 |
| 10 | A | 920 | 10 | 525 | 30 | 114.3 | 8.6 | ≥90 | 0.64 | 0.61 | 125 |
| 11 | A | 920 | 10 | 525 | 30 | 114.3 | 8.6 | ≥90 | 0.49 | 0.48 | 175 |
| 12 | A | 920 | 10 | 525 | 30 | 114.3 | 8.6 | ≥90 | 1.50 | 1.00 | 125 |

[#1]"≥90" indicates 90% or more.

pipes having a relatively thin wall were prepared is that a thin-wall steel pipe is disadvantage from the viewpoint of strength of the girth welded joint of steel pipe and hence, if the thin-wall steel pipe can ensure the strength, it is assumed that a steel pipe having a thicker wall than the thin-wall steel pipe can also sufficiently ensure the strength. The respective seamless steel pipes obtained in this manner were subjected to quenching and tempering under the conditions shown in Table 2 to produce steel pipe base metals. Water quenching was performed for all steel base metals. Air-cooling in the atmosphere was adopted during tempering for all steel base metals.

Thereafter, an observation specimen was sampled from the base metal portion of each girth welded joint of steel pipe such that a cross section perpendicular to the rolling direction forms an observation surface. Then, the observation Subsequently, after bevels were formed at the end portions of the obtained two steel pipe base metals in such a way as to have a groove angle of 60°, girth welding was performed by gas shield arc welding under the conditions shown in Table 2 with the end portions butted against each other. Girth welded joint of steel pipes (test Nos. 1 to 12) were produced in this manner. In performing girth welding, a solid wire for high-tensile steel (YM-100A) made by NIPPON STEEL WELDING & ENGINEERING CO., LTD. was used as a welding material, and Ar-20% $CO_2$ was used as shield gas. Further, a backing material was used, and a separation between the bevels was set to 0 mm. Table 3 shows measurement results of the chemical compositions of the root pass welded zones of the weld metal portions of the obtained respective girth welded joint of steel pipes.

[Table 3]

TABLE 3

| Test | | Chemical composition of weld metal portion (mass %, balance: Fe and impurities) | | | | | | | | |
|------|-------|------|------|------|-------|-------|------|-------|------|------|
| No. | steel | C | Si | Mn | P | S | Cu | N | Ni | Cr |
| 1 | A | 0.08 | 0.35 | 1.50 | 0.003 | 0.002 | 0.24 | 0.003 | 2.78 | 1.10 |
| 2 | B | 0.08 | 0.26 | 1.52 | 0.005 | 0.001 | 0.23 | 0.002 | 2.75 | 1.08 |
| 3 | C | 0.08 | 0.24 | 1.51 | 0.004 | 0.002 | 0.23 | 0.002 | 2.76 | 1.09 |
| 4 | D | 0.08 | 0.24 | 1.49 | 0.003 | 0.001 | 0.23 | 0.002 | 2.74 | 1.08 |
| 5 | E | 0.08 | 0.36 | 1.51 | 0.004 | 0.002 | 0.24 | 0.003 | 2.79 | 1.10 |
| 6 | F | 0.08 | 0.21 | 1.50 | 0.003 | 0.003 | 0.23 | 0.003 | 2.73 | 1.08 |
| 7 | G | 0.07 | 0.35 | 1.56 | 0.004 | 0.002 | 0.24 | 0.004 | 2.67 | 1.11 |
| 8 | G | 0.07 | 0.35 | 1.50 | 0.003 | 0.002 | 0.24 | 0.003 | 2.65 | 1.10 |
| 9 | H | 0.08 | 0.35 | 1.53 | 0.004 | 0.002 | 0.24 | 0.004 | 2.65 | 1.12 |
| 10 | A | 0.08 | 0.35 | 1.50 | 0.003 | 0.002 | 0.24 | 0.003 | 2.78 | 1.10 |
| 11 | A | 0.08 | 0.34 | 1.51 | 0.003 | 0.002 | 0.24 | 0.003 | 2.79 | 1.10 |
| 12 | A | 0.10 | 0.33 | 1.46 | 0.008 | 0.002 | 0.23 | 0.004 | 2.80 | 1.00 |

| Test | Chemical composition of weld metal portion (mass %, balance: Fe and impurities) | | | | | | | | |
|------|------|--------|--------|---------|-------|------|---------|---------|---------|
| No. | Mo | Nb | Al | B | Ti | V | Ca | Mg | REM |
| 1 | 0.56 | <0.003 | <0.002 | <0.0001 | 0.012 | 0.06 | <0.0001 | — | — |
| 2 | 0.57 | <0.003 | <0.002 | <0.0001 | 0.013 | 0.06 | <0.0001 | — | — |
| 3 | 0.57 | <0.003 | <0.002 | <0.0001 | 0.012 | 0.06 | <0.0001 | — | — |
| 4 | 0.56 | <0.003 | <0.002 | <0.0001 | 0.010 | 0.06 | <0.0001 | — | — |
| 5 | 0.56 | <0.003 | <0.002 | <0.0001 | 0.011 | 0.06 | <0.0001 | <0.0001 | <0.0001 |
| 6 | 0.58 | <0.003 | <0.002 | <0.0001 | 0.011 | 0.06 | <0.0001 | — | — |
| 7 | 0.58 | <0.003 | <0.002 | <0.0001 | 0.009 | 0.05 | <0.0001 | — | — |
| 8 | 0.58 | <0.003 | <0.002 | <0.0001 | 0.009 | 0.05 | <0.0001 | — | — |
| 9 | 0.58 | <0.003 | <0.002 | <0.0001 | 0.009 | 0.05 | <0.0001 | — | — |
| 10 | 0.56 | <0.003 | <0.002 | <0.0001 | 0.012 | 0.06 | <0.0001 | — | — |
| 11 | 0.56 | <0.003 | <0.002 | <0.0001 | 0.012 | 0.06 | <0.0001 | — | — |
| 12 | 0.50 | 0.010 | 0.010 | 0.0013 | 0.010 | 0.06 | 0.0011 | | |

Next, a No. 12B test coupon (an arc-shaped test coupon having a width of 25 mm) as described in Appendix E of JIS Z 2241:2011 was cut out from the base metal portion of each girth welded joint of steel pipe. Each test coupon was subjected to a tensile test in the atmosphere at room temperature in accordance with JIS Z 2241:2011 to obtain YS and TS. Further, three 2-mm V notch test coupons having a width of 10 mm and a thickness of 5 mm were cut out from the base metal portion of each girth welded joint of steel pipe such that a notch surface is a surface that includes the pipe axis direction and the wall thickness (pipe diameter) direction and the length direction of the test coupon aligns with the pipe axis direction. Then, the 2-mm V notch test coupons were subjected to a Charpy impact test at −40° C. in accordance with JIS Z 2242:2018. An impact value was obtained from the average value of absorbed energies of the three test coupons. Specifically, the impact value was obtained by dividing measured absorbed energy (J) by a cross-sectional area that is perpendicular to the length direction of the test coupon and is at a notch position (in the case in which a thickness is 5 mm, for example, width 8 mm×thickness 5 mm=0.4 cm²).

Subsequently, a cross weld tensile test was performed on a girth welded portion by using a No. 3 test coupon (the width of a parallel portion: 20 mm) to obtain YS and TS. The No. 3 test coupon is in accordance with JIS Z 3121:2013, and was sampled such that the length direction of the No. 3 test coupon aligns with the longitudinal direction of the girth welded joint of steel pipe and the girth welded portion is located at the center of the parallel portion.

Further, "the average hardness of the base metal portion", "the average softening width of the weld heat affected zone", "the average softening degree of the weld heat affected zone", "the maximum hardness of the weld heat affected zone", and "the width W of the weld metal portion" were measured by the above-mentioned procedures.

Solidification cracking resistance and cold cracking resistance were evaluated by the following methods. Specifically, the presence or absence of solidification cracking was evaluated by a method of FISCO test, and the presence or absence of cold cracking was evaluated by a method of y-groove weld cracking test. The respective test methods will be described below in more detail.

First, slabs were prepared from the steels A to H, and were heated for 60 minutes at 1250° C. and, thereafter, were subjected to hot rolling treatment within a temperature range of 1000 to 1250° C. to prepare steel plates having a wall thickness of 8.6 mm. Subsequently, the steel plates were subjected to quenching and tempering under the conditions shown in Table 2 to obtain steel plates that correspond to respective test Nos.

Figure 3:
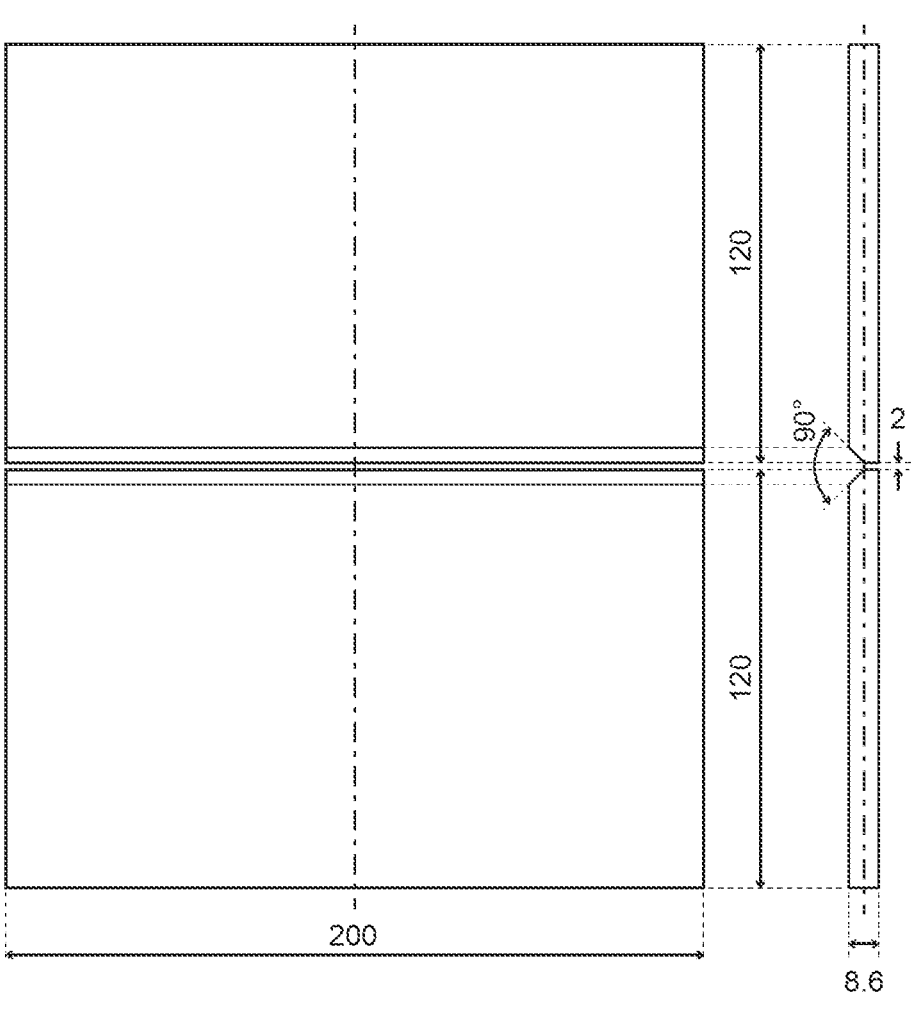
FIG. 3 is a diagram illustrating the shape of a test plate used in a method of FISCO test.

Two steel plates having a size of 120 mm×200 mm were cut out from each steel plate obtained and, thereafter, a bevel shape was formed on each steel plate to prepare test plates having a shape shown in FIG. 3. Then, a FISCO test was performed in accordance with JIS Z 3155:1993. In performing the test, two welding beads were formed, and conditions equal to the conditions shown in table 2 were adopted for welding conditions. Thereafter, the presence or absence of cracks was investigated by a method described in JIS Z 3155:1993. When no cracks were observed in either of the two welding beads, an evaluation of no solidification cracking (A) was given. When cracks were observed in one welding bead, an evaluation of solidification cracking present (B) was given. When cracks were observed in each of the two welding beads, an evaluation of solidification cracking present (C) was given. In the present example, only a steel plate to which no cold cracking (A) was given was determined to have excellent cold cracking resistance.

Figure 4:
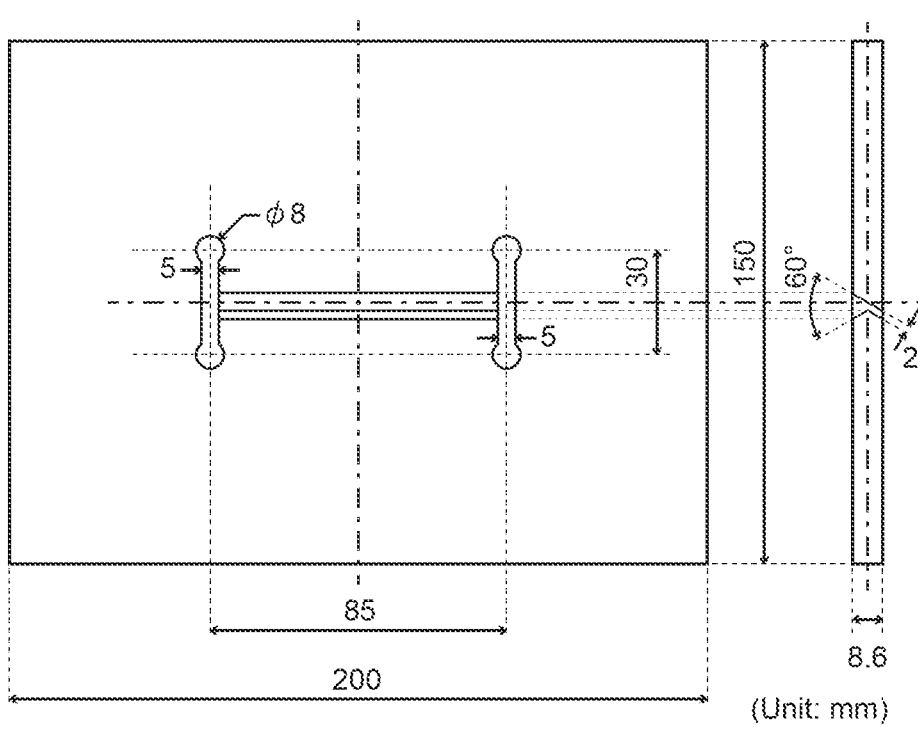
FIG. 4 is a diagram illustrating the shape of a test plate used in a method of y-groove weld cracking test.

A steel plate having a size of 150 mm×200 mm was cut out from each steel plate described above, and a hole having a diameter of 8 mm was formed at four positions and, thereafter, two grooves having a width of 5 mm were formed such that each groove connects two holes with each other. Thereafter, a bevel was formed between the two grooves by electrical discharge machining to prepare a test plate having a shape shown in FIG. 4. Then, a y-groove weld cracking test was performed, in accordance with JIS Z 3158:2016 except for the shape of the test plate. In performing the test, conditions equal to the conditions shown in Table 2 were adopted for welding conditions. Thereafter, the presence or absence of cracks was investigated by a method described in JIS Z 3158:2016. Cracks were investigated on five cross sections obtained by dividing the formed welding bead into four portions. When no cracks were observed on each of all cross sections, an evaluation of no cold cracking (A) was given. When cracks were observed on two or less cross sections, an evaluation of cold cracking present (B) was given. When cracks were observed on three or more cross sections, an evaluation of cold cracking present (C) was given. In the present example, a steel plate to which no solidification cracking (A) or solidification cracking present (B) was given was determined to have excellent solidification cracking resistance.

The respective investigation results are collectively shown in Table 4.

[Table 4]

TABLE 4

| | | Base metal portion | | | | Heat affected zone | | | | Joint | | Solidifi-cation | Cold | |
|---|---|---|---|---|---|---|---|---|---|---|---|---|---|---|
| | | | | Average hard- | Charpy impact value | Average soften-ing | Average soften-ing | Maxi-mum hard- | Weld metal portion | | | | | |
| Test No. | steel | TS (MPa) | YS (MPa) | ness (HV10) | at −40° C. (J/cm²) | width (mm) | degree (HV10) | ness (HV10) | Width W (mm) | TS (MPa) | YS (MPa) | crack-ing | crack-ing | |
| 1 | A | 1045 | 940 | 340 | 150 | 2.5 | 70 | 380 | 18.8 | 990 | 900 | A | A | Inventive |
| 2 | B | 1053 | 951 | 342 | 137 | 2.5 | 60 | 399 | 18.2 | 1011 | 921 | A | A | example |
| 3 | C | 1039 | 938 | 339 | 160 | 2.3 | 73 | 372 | 18.8 | 989 | 901 | A | A | |
| 4 | D | 1040 | 939 | 338 | 153 | 2.4 | 78 | 359 | 18.1 | 981 | 905 | A | A | |
| 5 | E | 1050 | 955 | 345 | 140 | 2.5 | 71 | 379 | 17.1 | 995 | 910 | A | A | |
| 6 | F | 1020 | 920 | 331 | 179 | 2.3 | 84 | 355 | 18.6 | 953 | 870 | A | A | Compar- |
| 7 | G | 1077 | 978 | 350 | 103 | 2.5 | 29 | 469 | 17.3 | 1057 | 939 | A | C | ative |
| 8 | G | 1100 | 985 | 360 | 70 | 2.5 | 40 | 470 | 17.0 | 1047 | 925 | A | C | example |
| 9 | H | 1060 | 960 | 348 | 110 | 2.5 | 48 | 417 | 18.2 | 1029 | 918 | A | B | |
| 10 | A | 1044 | 940 | 339 | 145 | 4.1 | 72 | 384 | 19.0 | 979 | 885 | A | A | |
| 11 | A | 1045 | 945 | 340 | 151 | 4.1 | 75 | 375 | 18.9 | 978 | 885 | A | A | |
| 13 | A | 1044 | 943 | 339 | 145 | 5.2 | 85 | 379 | 20.0 | 950 | 865 | C | A | |

As shown in Table 4, the test Nos. 1 to 5 that satisfy all definitions in the present invention resulted in having high joint strength, excellent solidification cracking resistance, and cold cracking resistance. In contrast, the test Nos. 6 to 12 that do not satisfy the definitions in the present invention and that are comparative examples resulted in deterioration of at least any one of joint strength, solidification cracking resistance, and cold cracking resistance.

EXAMPLE 2

In the same manner as the example 1, steels I to P having the chemical compositions shown in Table 5 were melted, and were subjected to a converter-continuous casting process to cast rectangular billets. Further, the rectangular billets were shaped into circular billets by hot forging, and were then cooled to room temperature.

[Table 5]

TABLE 5

| | Chemical composition of base metal portion (mass %, balance: Fe and impurities) | | | | | | | | | | |
|---|---|---|---|---|---|---|---|---|---|---|---|
| Steel | C | Si | Mn | P | S | Cu | N | Ni | Cr | Mo | Nb |
| I | 0.16 | 0.56 | 0.11 | 0.016 | 0.004 | 0.11 | 0.006 | 0.22 | 0.38 | 0.40 | 0.03 |
| J | 0.15 | 0.75 | 0.10 | 0.012 | 0.004 | 0.09 | 0.006 | 0.22 | 0.38 | 0.40 | 0.03 |
| K | 0.14 | 0.89 | 0.07 | 0.012 | 0.003 | 0.17 | 0.004 | 0.22 | 0.47 | 0.48 | 0.05 |
| L | 0.17 | 0.43 | 0.23 | 0.021 | 0.004 | 0.15 | 0.007 | 0.22 | 0.38 | 0.40 | 0.03 |
| M | 0.16 | 0.63 | 0.50 | 0.018 | 0.005 | 0.18 | 0.007 | 0.22 | 0.38 | 0.40 | 0.03 |
| N | 0.20 | 0.90 | 0.06 | 0.012 | 0.003 | 0.05 | 0.004 | 0.22 | 0.31 | 0.31 | 0.01 |

TABLE 5-continued

| | | | | | | | | | | | |
|---|---|---|---|---|---|---|---|---|---|---|---|
| O | 0.11 | 0.95 | 1.15 | 0.010 | 0.004 | 0.19 | 0.005 | 0.48 | 0.48 | 0.48 | 0.05 |
| P | 0.17 | 0.81 | 0.80 | 0.020 | 0.004 | 0.18 | 0.005 | 0.22 | 0.38 | 0.40 | 0.03 |

| | Chemical composition of base metal portion (mass %, balance: Fe and impurities) | | | | | | | | $Ac_1$ point | $Ac_3$ point |
|---|---|---|---|---|---|---|---|---|---|---|
| Steel | Al | B | Ti | V | Ca | Mg | REM | Pcm | | |
| I | 0.090 | 0.0013 | 0.018 | 0.11 | 0.0005 | — | — | 0.25 | 728 | 919 |
| J | 0.088 | 0.0013 | 0.018 | 0.11 | 0.0073 | 0.0069 | 0.0068 | 0.25 | 733 | 927 |
| K | 0.077 | 0.0020 | 0.015 | 0.20 | 0.0030 | — | — | 0.26 | 739 | 941 |
| L | 0.090 | 0.0013 | 0.018 | 0.11 | 0.0055 | 0.0010 | — | 0.26 | 723 | 909 |
| M | 0.090 | 0.0013 | 0.047 | 0.11 | 0.0010 | — | — | 0.27 | 726 | 922 |
| N | 0.050 | 0.0005 | 0.038 | 0.01 | 0.0048 | — | — | 0.28 | 737 | 904 |
| O | 0.063 | 0.0020 | 0.022 | 0.20 | 0.0018 | — | — | 0.29 | 730 | 911 |
| P | 0.092 | 0.0013 | 0.018 | 0.13 | — | — | — | 0.30 | 728 | 909 |

The above-mentioned circular billets were heated at 1240° C., and two seamless steel pipes having an outer diameter and a wall thickness shown in Table 6 were prepared from each circular billet by a Mannesmann-mandrel process such that a finishing temperature falls within a range of 850 to 950° C. Thereafter, the seamless steel pipes were cooled to room temperature. The respective seamless steel pipes obtained in this manner were subjected to quenching and tempering under the conditions shown in table 6 to produce steel pipe base metals. Water quenching was performed for all steel base metals. Air-cooling in the atmosphere was adopted during tempering for all steel base metals.

Thereafter, an observation specimen was sampled from the base metal portion of each girth welded joint of steel pipe such that a cross section perpendicular to the rolling direction forms an observation surface. Then, the observation surface was polished and, thereafter, was subjected to nital etching. Thereafter, the area fraction of tempered martensite was obtained from a photograph of a micro-structure photographed by an optical microscope with magnification 500×.

[Table 6]

TABLE 6

| Test No. | steel | Quenching | | Tempering | | Base metal portion | | | Welding condition | | |
|---|---|---|---|---|---|---|---|---|---|---|---|
| | | Heating temperature (° C.) | Holding time (min) | Heating temperature (° C.) | Holding time (min) | Outer diameter (mm) | Wall thickness (mm) | Tempered martensite area fraction[#1] (%) | Maximum heat input (kJ/mm) | Average heat input (kJ/mm) | Inter-pass temperature (° C.) |
| 13 | I | 920 | 10 | 500 | 30 | 177.8 | 13.0 | ≥90 | 0.49 | 0.48 | 134 |
| 14 | J | 920 | 10 | 500 | 30 | 177.8 | 13.0 | ≥90 | 0.49 | 0.47 | 111 |
| 15 | K | 920 | 10 | 500 | 30 | 177.8 | 13.0 | ≥90 | 0.49 | 0.46 | 125 |
| 16 | L | 920 | 10 | 500 | 30 | 177.8 | 13.0 | ≥90 | 0.49 | 0.48 | 131 |
| 17 | M | 920 | 10 | 500 | 30 | 177.8 | 19.0 | ≥90 | 0.49 | 0.46 | 115 |
| 18 | N | 920 | 10 | 500 | 30 | 177.8 | 19.0 | ≥90 | 0.49 | 0.48 | 136 |
| 19 | O | 920 | 10 | 500 | 30 | 177.8 | 19.0 | ≥90 | 0.49 | 0.48 | 117 |
| 20 | P | 920 | 10 | 500 | 30 | 177.8 | 19.0 | ≥90 | 0.49 | 0.47 | 109 |

[#1]"≥90" indicates 90% or more.

Subsequently, after bevels were formed at the end portions of the obtained two steel pipe base metals in such a way as to have a groove angle of 60°, girth welding was performed by gas shield arc welding under the conditions shown in Table 6 with the end portions butted against each other. Girth welded joint of steel pipes (test Nos. 13 to 20) were produced in this manner. In performing girth welding, a welding material having a chemical composition shown in Table 7 was used, and Ar-20% $CO_2$ was used as shield gas. Further, a backing material was used, and a separation between the bevels was set to 0 mm. Table 8 shows measurement results of the chemical compositions of the root pass welded zones of the weld metal portions of the obtained respective girth welded joint of steel pipes.

[Table 7]

TABLE 7

| Welding | Chemical composition of welding material (mass %, balance: Fe and impurities) | | | | | | | | | | | | | | | | | |
|---|---|---|---|---|---|---|---|---|---|---|---|---|---|---|---|---|---|---|
| material | C | Si | Mn | P | S | Cu | N | Ni | Cr | Mo | Nb | Al | B | Ti | V | Ca | Mg | REM |
| a | 0.07 | 1.00 | 1.26 | 0.001 | 0.005 | 0.05 | 0.005 | 3.10 | 0.99 | 0.74 | 0.005 | 0.004 | 0.0009 | 0.016 | 0.10 | — | — | — |
| b | 0.04 | 1.00 | 1.48 | 0.002 | 0.003 | 0.38 | 0.005 | 2.94 | 1.38 | 0.65 | 0.004 | 0.005 | 0.0009 | 0.033 | 0.07 | — | — | — |
| c | 0.07 | 0.73 | 1.78 | 0.008 | 0.005 | 0.31 | 0.004 | 2.69 | 1.34 | 0.44 | 0.002 | 0.007 | 0.0008 | 0.044 | 0.02 | — | — | — |
| d | 0.06 | 0.91 | 1.52 | 0.009 | 0.003 | 0.32 | 0.003 | 2.82 | 0.98 | 0.83 | 0.009 | 0.003 | 0.0003 | 0.045 | 0.04 | — | — | — |
| e | 0.04 | 0.05 | 2.02 | 0.004 | 0.002 | 0.04 | 0.004 | 2.65 | 1.39 | 0.91 | 0.009 | 0.003 | 0.0009 | 0.007 | 0.14 | — | — | — |
| f | 0.04 | 0.10 | 1.98 | 0.005 | 0.005 | 0.36 | 0.004 | 3.00 | 1.36 | 0.78 | 0.004 | 0.008 | 0.0004 | 0.014 | 0.20 | — | — | — |
| g | 0.12 | 0.07 | 1.30 | 0.004 | 0.001 | 0.10 | 0.005 | 2.62 | 1.02 | 0.49 | 0.003 | 0.002 | 0.0003 | 0.035 | 0.01 | — | — | — |
| h | 0.04 | 0.45 | 2.02 | 0.008 | 0.002 | 0.18 | 0.007 | 3.15 | 1.23 | 0.54 | 0.007 | 0.007 | 0.0004 | 0.004 | 0.06 | 0.0087 | 0.0078 | 0.0059 |

TABLE 8

| Test | | Welding | Chemical composition of weld metal portion (mass %, balance: Fe and impurities) | | | | | | | |
|---|---|---|---|---|---|---|---|---|---|---|
| No. | steel | material | C | Si | Mn | P | S | Cu | N | Ni |
| 13 | I | a | 0.07 | 0.99 | 1.20 | 0.002 | 0.005 | 0.05 | 0.006 | 2.96 |
| 14 | J | b | 0.05 | 0.99 | 1.41 | 0.001 | 0.003 | 0.37 | 0.007 | 2.80 |
| 15 | K | c | 0.07 | 0.74 | 1.69 | 0.008 | 0.005 | 0.30 | 0.005 | 2.57 |
| 16 | L | d | 0.07 | 0.89 | 1.46 | 0.010 | 0.003 | 0.31 | 0.003 | 2.69 |
| 17 | M | e | 0.04 | 0.08 | 1.94 | 0.005 | 0.001 | 0.05 | 0.005 | 2.53 |
| 18 | N | f | 0.04 | 0.13 | 1.88 | 0.005 | 0.005 | 0.34 | 0.004 | 2.89 |
| 19 | O | g | 0.12 | 0.10 | 1.29 | 0.004 | 0.001 | 0.10 | 0.006 | 2.51 |
| 20 | P | h | 0.05 | 0.48 | 1.96 | 0.009 | 0.002 | 0.18 | 0.007 | 3.00 |

| Test | Chemical composition of weld metal portion (mass %, balance: Fe and impurities) | | | | | | | | | |
|---|---|---|---|---|---|---|---|---|---|---|
| No. | Cr | Mo | Nb | Al | B | Ti | V | Ca | Mg | REM |
| 13 | 0.96 | 0.72 | 0.006 | 0.006 | 0.0009 | 0.016 | 0.10 | <0.0001 | — | — |
| 14 | 1.33 | 0.64 | 0.005 | 0.006 | 0.0009 | 0.032 | 0.07 | 0.0005 | 0.0003 | 0.0003 |
| 15 | 1.30 | 0.44 | 0.004 | 0.008 | 0.0009 | 0.043 | 0.03 | 0.0002 | — | — |
| 16 | 0.95 | 0.79 | 0.010 | 0.005 | 0.0004 | 0.043 | 0.04 | 0.0003 | <0.0001 | — |
| 17 | 1.35 | 0.88 | 0.010 | 0.005 | 0.0009 | 0.009 | 0.14 | <0.0001 | — | — |
| 18 | 1.31 | 0.76 | 0.004 | 0.008 | 0.0004 | 0.015 | 0.19 | 0.0002 | — | — |
| 19 | 0.99 | 0.49 | 0.005 | 0.003 | 0.0004 | 0.034 | 0.02 | <0.0001 | — | — |
| 20 | 1.19 | 0.53 | 0.008 | 0.007 | 0.0004 | 0.005 | 0.06 | 0.0085 | 0.0086 | 0.0058 |

Next, YS, TS, and the Charpy impact value of the base metal portion, YS and TS of the girth welded portion in a cross weld tensile test, "the average hardness of the base metal portion", "the average softening width of the weld heat affected zone", "the average softening degree of the weld heat affected zone", "the maximum hardness of the weld heat affected zone", and "the width W of the weld metal portion" were measured by methods equal to the methods used in the example 1. Further, solidification cracking resistance and cold cracking resistance were evaluated by methods equal to the method used in the example 1.

The respective investigation results are collectively shown in Table 9.

[Table 9]

TABLE 9

| Test No. | steel | Welding material | Base metal portion | | | | Heat affected zone | | | Weld metal portion Width | Joint | | Solidification cracking | Cold cracking | |
|---|---|---|---|---|---|---|---|---|---|---|---|---|---|---|---|
| | | | TS (MPa) | YS (MPa) | Average hardness (HV10) | Charpy impact value at −40° C. (J/cm²) | Average softening width (mm) | Average softening degree (HV10) | Maximum hardness (HV10) | W (mm) | TS (MPa) | YS (MPa) | | | |
| 13 | I | a | 1030 | 925 | 330 | 158 | 2.3 | 73 | 350 | 22.3 | 990 | 900 | B | A | Inventive example |
| 14 | J | b | 1038 | 943 | 350 | 142 | 2.2 | 69 | 363 | 22.2 | 1008 | 914 | B | A | |
| 15 | K | c | 1039 | 934 | 338 | 139 | 2.5 | 73 | 365 | 22.7 | 1002 | 908 | B | A | |
| 16 | L | d | 1044 | 943 | 337 | 120 | 2.3 | 68 | 374 | 21.9 | 1005 | 905 | A | A | |
| 17 | M | e | 1030 | 925 | 318 | 155 | 2.4 | 73 | 381 | 28.6 | 998 | 906 | B | A | |
| 18 | N | f | 1042 | 945 | 340 | 151 | 2.5 | 67 | 382 | 28.1 | 1010 | 918 | A | A | |
| 19 | O | g | 1044 | 939 | 344 | 144 | 2.4 | 66 | 389 | 29.1 | 1005 | 905 | A | A | |
| 20 | P | h | 1049 | 952 | 356 | 118 | 2.2 | 60 | 396 | 29.6 | 1017 | 925 | A | A | |

As shown in Table 9, the test Nos. 13 to 20 that satisfy all definitions in the present invention resulted in having high joint strength, excellent solidification cracking resistance, and cold cracking resistance.

Industrial Applicability

According to the present invention, it is possible to obtain a girth welded joint of steel pipe having high joint strength and excellent cold cracking resistance. Accordingly, the girth welded joint of steel pipe according to the present invention can be preferably used for a machine structural member, particularly, for a crane boom.

REFERENCE SIGNS LIST 1a, 1b base metal portion
2 girth welded portion
2a weld metal portion
2b, 2c weld heat affected zone
2d, 2e intersection
10 girth welded joint of steel pipe

The invention claimed is:

1. A girth welded joint of steel pipe comprising: a base metal portion and a girth welded portion, wherein
the girth welded portion is formed of a weld metal portion and a weld heat affected zone,
a chemical composition of the base metal portion consists of, by mass %,
C: 0.10 to 0.20%,
Si: 0.05 to 1.00%,
Mn: 0.05 to 1.20%,
P: 0.025% or less,
S: 0.005% or less,
Cu: 0.20% or less,
N: 0.007% or less,
Ni: 0.20 to 0.50%,
Cr: 0.30% or more and less than 0.50%,
Mo: 0.30 to 0.50%,
Nb: 0.01 to 0.05%,
Al: 0.001 to 0.100%,
B: 0.0005 to 0.0020%,
Ti: 0.003 to 0.050%,
V: 0.01 to 0.20%,
a total of any one or more selected from Ca, Mg, and REM: 0 to 0.0250%, and
balance: Fe and impurities,
a value of Pcm expressed by a formula [A] described below is within a range of 0.25 to 0.30, a chemical composition of the weld metal portion consists of, by mass %,
C: 0.04 to 0.14%,
Si: 0.05 to 1.00%,
Mn: 1.00 to 2.00%,
P: 0.025% or less,
S: 0.005% or less,
Cu: 0.50% or less,
N: 0.007% or less,
Ni: 2.50 to 3.00%,
Cr: 0.90% or more and less than 1.40%,
Mo: 0.40 to 0.90%,
Nb: 0.010% or less,
Al: 0.010% or less,
B: 0.0010% or less,
Ti: 0.003 to 0.050%,
V: 0.01 to 0.20%,
a total of any one or more selected from Ca, Mg, and REM: 0 to 0.0250%, and
balance: Fe and impurities,
each of tensile strength of the base metal portion and tensile strength of the girth welded portion in a cross weld tensile test is 980 MPa or more, and
average hardness of the base metal portion is 300 HV10 or more, an average softening width of the weld heat affected zone is 4.0 mm or less, and an average softening degree of the weld heat affected zone is 80 HV10 or less:

$$Pcm = C + (Si/30) + (Mn/20) + \qquad\qquad [A]$$

$$(Cu/20) + (Ni/60) + (Cr/20) + (Mo/15) + (V/10) + 5B$$

where each symbol of an element in the formula [A] denotes a content (mass %) of the element contained in steel, and 0 is given when the element is not contained in the steel.

2. The girth welded joint of steel pipe according to claim 1, wherein
a metallographic micro-structure of the base metal portion includes, by area %,
tempered martensite: 90% or more.

3. The girth welded joint of steel pipe according to claim 1, wherein
the weld metal portion is made of multi-pass weld metal.

4. The girth welded joint of steel pipe according to claim 2, wherein
the weld metal portion is made of multi-pass weld metal.

* * * * *